United States Patent [19]

Breveglieri et al.

[11] Patent Number: 4,743,040
[45] Date of Patent: May 10, 1988

[54] UTILITY CART

[75] Inventors: Frank Breveglieri, Spring Lake, Mich.; Kenneth F. Streit, Mt. Prospect, Ill.

[73] Assignee: Geerpres, Inc., Muskegon, Mich.

[21] Appl. No.: 912,567

[22] Filed: Sep. 29, 1986

[51] Int. Cl.⁴ ................................................ B62B 3/02
[52] U.S. Cl. .................................... 280/47.35; 403/167
[58] Field of Search ............ 280/47.34, 47.35, 79.1 R, 280/79.1 A, 79.2, 47.26, 47.28; 403/167, 168; 108/111; 312/265; 211/189; 248/129, 98

[56] References Cited

U.S. PATENT DOCUMENTS

| | | | |
|---|---|---|---|
| D. 115,352 | 6/1939 | Scudder | D34/18 |
| 1,097,163 | 5/1914 | Brown | 280/47.35 |
| 2,311,422 | 2/1943 | Walling | 280/50 |
| 2,424,644 | 7/1947 | Barrett | 280/50 |
| 2,583,196 | 1/1952 | Zander et al. | 280/47.35 |
| 2,596,749 | 5/1952 | Webber | 211/1 |
| 2,833,550 | 5/1958 | Frick | 280/47.34 |
| 3,102,648 | 9/1963 | Hughes | 214/375 |
| 3,145,031 | 8/1964 | Wilkinson | 280/47.35 |
| 3,874,531 | 4/1975 | Mayo | 214/130 R |
| 3,894,748 | 7/1975 | Ratcliff | 280/47.35 |
| 4,119,044 | 10/1978 | Hines | 108/27 |
| 4,179,132 | 12/1979 | Rich | 280/47.26 |
| 4,222,145 | 9/1980 | Lowder | 280/47.26 |
| 4,237,798 | 12/1980 | Welsch et al. | 108/111 |
| 4,281,843 | 8/1981 | Johnson et al. | 280/47.26 |
| 4,350,366 | 9/1982 | Helms | 208/655 |
| 4,355,818 | 10/1982 | Watts | 280/654 |
| 4,497,524 | 2/1985 | Levings, Jr. et al. | 312/265 |

Primary Examiner—John J. Love
Assistant Examiner—Richard Camby
Attorney, Agent, or Firm—Harness, Dickey & Pierce

[57] ABSTRACT

The present invention is a manually propelled utility cart having a base, an intermediate slidable tray, and a top tray. The base includes wheels for movement of the utility cart along the floor surface. The base includes a utility tray, lower support post engaging portions and a mop bucket carrying portion. The mop bucket carrying portion includes caster curbs for restraining movement of a castered mop bucket carried on the mop bucket carrying portion, and has a draining surface and drain and drain plug for selectively retaining or draining spillage from the bucket. Vertical support members are provided for supporting the intermediate tray and the top tray vertically upward from the base. The intermediate tray has adjustable positioning and is in slidable engagement with the vertical support members. The top tray includes molded utensil clips and has a handle with an integral trash bag retention portion. The upper tray also has upper support member engaging portions. The vertical structural support members are provided and include at least one hollow rod structural member which is engaged and secured in compression between the upper and lower support post engagement portions. The adjustable positioning includes releasable clamping systems for releasably clamping the intermediate tray in variable vertical positions between the base and the top tray.

22 Claims, 2 Drawing Sheets

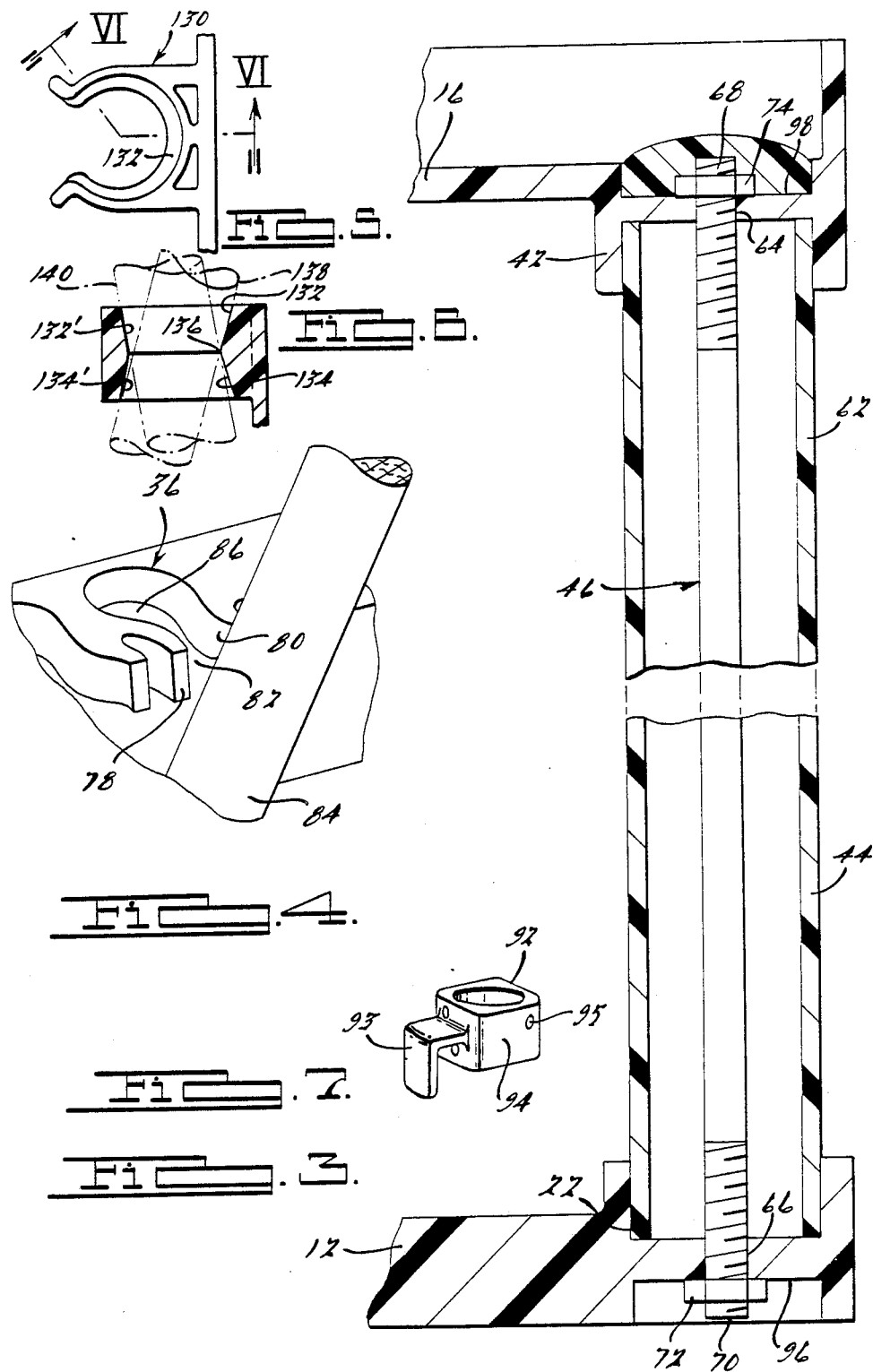

UTILITY CART

TECHNICAL FIELD

The subject invention relates to a movable cart for the transport of cleaning utensils. More specifically, the present invention is a wheeled utility cart for use by a cleaning person wherein the cleaning person can efficiently carry all the necessary implements for normal cleaning duties.

BACKGROUND ART

It has been the goal of prior art devices to produce a utility cart which efficiently and conveniently will hold in a readily accessible position all implements or tools required in a janitorial or cleaning person's job. However, because of the varying natures in the janitorial or cleaning job environment, the cart must be flexible enough to be readily adapted to a particular job environment. In addition, the utility cart must be of durable construction which is impervious to harsh and caustic chemicals generally used in cleaning operations.

Prior art devices have generally met the durability requirement for a utility cart by constructing the apparatus out of heavy duty steel tubular members. The tubular members are generally welded or clamped together. Some examples of these prior art devices include H. J. Barnett, U.S. Pat. No. 2,424,644; Webber, U.S. Pat. No. 2,596,749; Walling, U.S. Pat. No. 2,311,422; and Scudder, U.S. Pat. No. DES 115,352; and Mayo, U.S. Pat. No. 3,874,531. The increased weight, because of the use of steel in these utility carts, requires a heavy duty axle and wheel assembly, substantially increasing the cost of the unit, or may even require a motorized vehicle to transport the cart as taught by Mayo, U.S. Pat. No. 3,874,531. In addition, the use of these heavy materials creates unnecessary fatigue on the cleaning personnel who are the ultimate users of these carts due to the extra effort required to push the heavy utility cart around. A further disadvantage of the use of steel construction is that it readily yields to the corrosive properties of cleaning materials which will inevitably get spilled or otherwise come into contact with the parts of the utility carts. In addition, steel is not waterproof and easily corrodes when exposed to the elements increasing the necessary maintenance such as painting and other types of protection of the cart.

In addition, the prior art devices either do not efficiently use cart space, or in the alternative do not provide sufficient cart space for all of the required cleaning utensils. These devices also are inflexible and cannot be customized to the particular needs of a final user.

STATEMENT OF THE INVENTION

According to the present invention, there is provided a manually propelled utility cart comprising a base means, a top tray means, and an intermediate tray means. The base means includes a wheeled movement means for multidirectional horizontal movement of the utility cart along a floor surface. The base means also includes a utility tray means, a lower support post engaging means, and a mop bucket carrying means.

The mop bucket carrying means includes a means for restraining the movement of the mop bucket and also includes a draining surface means having a drain and drain plug means for selectively retaining or draining any spillage from the mop bucket carried on the mop bucket carrying means. A vertical structural support means is provided for supporting the intermediate tray means and the top tray means in a vertically upward position from the base means. The intermediate tray means has adjustable positioning means and is also in slidable engagement with the vertical structural support means. The top tray means also includes a molded utensil holding means. The top tray means also includes a handle means having an integral trash bag retention means. The top tray means has an upper support post engaging means. The vertical structural support means includes at least one hollow rod structural member which is engaged and secured in compression between lower support post engagement means and the upper support post engaging means by a compression means. The adjustable positioning means includes releasable clamping means for releasably clamping the intermediate tray means in variable vertical positions between the utility tray means and the top tray means.

It is an object of the present invention to construct a utility cart which solves the problems of the prior art devices.

More particularly, it is an object of the present invention to provide a utility cart of a simplified lightweight and durable construction which is impervious to caustic chemicals and fluids used by cleaning personnel.

It is a further object of the present invention to provide a utility cart which uses structural components of readily available materials, is inexpensive and easy to construct and provides for easy customization and replacement of structural components.

It is a further object of the present invention to provide a utility cart with all major components being interchangeable by the final user, thus allowing for replacement of only a part of the utility cart when only a part is damaged or broken.

It is a further object of the invention to provide a secure means for carrying a mop bucket with or without casters, on the utility cart itself, thus eliminating the cumbersome task of the carrying or pulling of the castered mop bucket, by the cleaning person.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross sectional plan view partially broken away showing the compressed tubular construction of the present invention; and FIG. 4 is a detailed perspective view of the molded clip assembly of the present invention.

FIG. 5 is a top view of the modified mop handle engaging clip of the present invention.

FIG. 6 is a cross sectional view of the modified mop handle engaging clip of FIG. 5 taken along line 6—6.

FIG. 7 is a perspective view of the adjustable hook means of the present invention.

DETAILED DESCRIPTION OF THE DRAWINGS

Figure 1:
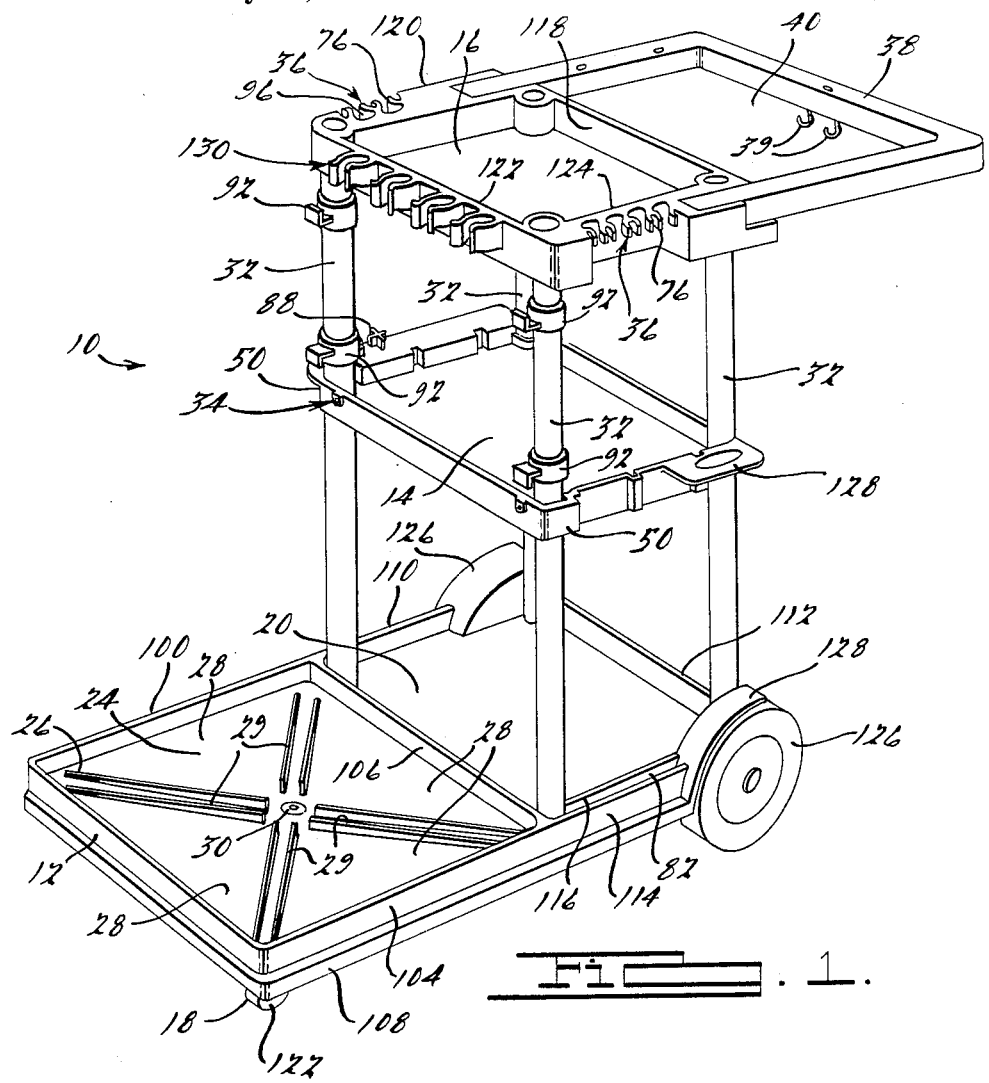
FIG. 1 is an elevational perspective view of the utility cart of the present invention.

A manually propelled utility cart of the present invention is generally shown at 10 in FIG. 1. As shown in FIG. 1, the utility cart 10 comprises a base means 12, an intermediate tray means 14, and a top tray means 16. The base means 12 includes wheeled movement means 18 which allows the utility cart to move in multiple horizontal directions along the floor surface. The base means 12 includes a utility tray means 20, lower support post engaging means 22, and mop bucket carrying means 24. The mop bucket carrying means 24 includes means 26 for restraining movement of a castered mop bucket and levelly and securely carrying a mop bucket. The mop bucket carrying means 24 also includes a draining surface 28 and a drain and drain plug means 30. The draining surface means 28 along with the drain and drain plug means 30 allows the final user to selectively retain or drain any spillage from the mop bucket while the mop bucket is transported on the mop bucket carrying means 24.

The mop bucket carrying means 24 of a preferred embodiment of the present invention defines a level surface which has the dual function of either securely and levelly holding a normal mop bucket or will engage and restrain the movement of the casters of a castered mop bucket.

In a preferred embodiment of the present invention, the mop bucket carrying means 24 is a box-like portion having the draining surface 28 as the floor of the box-like portion. The draining surface tapers downward toward the drain and drain plug means 30. The drains surface includes four triangular shaped draining portions angled downward which form an inverse pyramidal shaped surface. The mop bucket carrying means includes four pairs of rib members 26. Each pair of rib members extends diagonally inward from the corners of the box-like portion with the inner end of each rib member tapering into a wider girth such that the top surface 29 of the rib members 26 would be on the same plane. The top surface 29 provides a level supporting surface for a mop bucket.

Vertical structural support means 32 are provided in the present invention for supporting the intermediate tray means 14 and the top tray means 16 in a vertically upward position from the base means 12. The intermediate tray means 14 has adjustable positioning means generally shown at 34. The intermediate tray means 14 is also in slidable engagement with the vertical structural support means 32.

The top tray means 16 includes molded utensil holding means generally shown at 36. The top tray means 16 also includes handle means 38 which has integral trash bag retention means 40 integrally attached thereto. The upper tray means 16 also has upper support post engaging means 42 which are best shown in FIG. 3. The vertical structural support means 32 includes at least one hollow rod structural member 44 which is engaged and secured in compression between the lower support post engagement means 22 and the upper support post engagement means 42. The compression is accomplished by way of compression means generally shown at 46 in FIG. 3.

The adjustable positioning means includes a releasable clamping means 48 for releasably clamping the intermediate tray means 14 in variable vertical positions between the utility tray means 20 and the top tray means 16.

The slidable engagement of the intermediate tray means 14 is accomplished by a through hole in the intermediate tray means 14 at the corners 50 of the intermediate tray means 14. The through hole has an arcuate vertical surface 52 which operates to engage the outside of the diameter of the tubular structural member 44. The clamping means includes an arcuate strap 56 which has a pair of companion bolted flanges 58. The pair of companion bolted flanges 58 are operatively attached to the arcuate vertical surface 52 and operate to securely clamp the tubular structural member 44 between the arcuate vertical surface 52 and arcuate strap 56.

The compression means 46 of the present invention includes a threaded rod means 60. The threaded rod means 60 is internally placed in the axial opening 62 of the tubular structural member 44. The threaded rod means 60 also passes through holes 64 and 66 in the upper 42 and lower 22 support post engagement means and thereby defines a pair of threaded engaging ends 68 and 70. Nut means 72 and 74 are provided for operatively engaging the threaded rod means 60 and compressing the tubular support member 44 between the upper 42 and lower 22 support post engagement means.

In a preferred embodiment of the invention, the tubular support member includes a length of PVC tubing which is readily available as an off-the-shelf item in hardware stores and the like. In addition, other plastic materials could be used for the tubular support member of the present invention provided that the material has the requisite structural integrity and is impervious to cleaning chemicals and other solutions used by cleaning personnel.

The threaded rod means in the preferred embodiment of the present invention is of the type readily available at any hardware store. The threaded rod may be threaded along its entire length or in the alternative may as effectively only have threaded ends without departing from the present invention. While the preferred embodiment of the present invention uses steel rod, any other material which is structurally suitable could be used without departing from the present invention. In addition, the threaded rod means can be readily obtained in various lengths from any of a number of sources. Therefore, the present invention provides a customizable vertical height, accomplished by either cutting or obtaining shorter or longer lengths of PVC tubings and corresponding shorter or longer lengths of threaded rods.

The utensil holding means 36 of the present invention includes a plurality 76 of molded clips which are integrally molded with the top tray means 16. As shown in FIG. 4, each of the clips 36 includes a pair of resilient clamping arms 78 and 80. The clamping arms have a generally arcuate shape and define a narrow entry hole 82. In addition, the base means 12 of the present invention has a utensil handle retaining slot 82 located on the utility tray portion 20. In operation, the utensil holding means 36 operates in the following manner. A terminal end of a mop handle 84 is placed in the narrow entry hole retaining slot 82. The handle 84 engages the handle securing portion 86 by inward pressure against the resilient clamping arms 78 and 80 which cause arms 78 and 80 to move outward thereby opening the narrow entry hole 82. This allows the handle to move inward and thereby holds the handle in the handle securing portion 86 by inward pressure due to the resilient clamping arms 78 and 80.

The front wall 122 of the present invention also includes mop handle engaging clips, generally shown at 130, which hold a mop handle while the mop head is in the mop bucket for securely transporting the mop and mop bucket on the utility cart.

When a mop is resting in a mop bucket which is in place on the utility cart, the mop handle will be at an angle as it leans against wall 122 of top tray 16. To facilitate securing of the mop handle, the mop handle engaging clips of the present invention are modified to securely hold a tilted mop handle. More specifically, as illustrated in FIG. 6, the mop handle engaging clips 130 of the present invention include modified handle engaging surfaces 132, 132′ and 134, 134′ which are generally frusto-conical surfaces which abut to one another at ridge 136. The frusto-conical surfaces 132, 134 are skewed such that the back surfaces 132, 134 are at a greater angle from the vertical than frontal surfaces 132′, 134′.

The configuration of mop handle engaging clips 130 is advantageous in providing secure engagement of a mop handle at a variety of angles. A mop handle protruding from a mop bucket may exit the mop bucket at an infinite variety of angles due to the variable positioning of the mop head in the mop bucket. Thus as shown in FIG. 6, the modified mop handle engagement clamps will facilitate the secure engagement of a mop handle because of engagement of the mop handle over a relatively large circumferential surface area even when the mop handle is at an angle to the clip. Thus, as shown in FIG. 6, mop handle positions 138 and 140 are shown to better illustrate engagement of a mop handle by the modified mop handle engagement clips. As an illustration, a mop handle in the position of 138, wherein the mop handle is leaning toward the top tray 16, is in aligned engagement with surface 132 of the clip 130 and moving circumferentially toward surface 132′, the mop handle is engaged by ridge 136 and then by the lower portion of surface 134′, thus providing for secured engagement of the mop handle.

As shown in the alternative, when the mop handle is angled away from the tray 16 as in position 140, the mop handle would be circumferentially engaged by aligned engagement with surface 132′, and engagement with ridge 136. These examples are given as illustrations, the modified mop handle engagement clips of the present invention will securely hold a mop handle at a variety of angles, including those shown.

In a preferred embodiment of the invention four modified mop handle engagement clips are provided, preferably with two generally positioned at the center of the wall 122. In addition, the clips are integrally molded with wall 122 in a preferred embodiment of the invention.

In addition, vacuum wand extensions may be held in the utility cart of the present invention by molded clips 90 on the side opposed to the utensil handle molded clips and having the intermediate tray portion 14 which includes molded vacuum wand extension holders 88. A vacuum wand extension is placed over holder 88 and then is placed into a corresponding molded clip 90 on the top tray means 16.

An adjustable hook means 92 is provided in the present invention for convenient placement on one or several of the tubular structural members of the present invention. The adjustable hook means 92 includes a hook portion 93, a body portion 94, and a clamping portion 95. The hook 93 and body 94 portions may be a single integrally molded assembly or in the alternative, the hook portion may be attached separately to facilitate the use of interchangeable hook configurations. For instance, a hook configuration which is swiveable may be used in the present invention. The clamping portion of the present invention is operatively attached to the body portion and is of the same clamping means configuration illustrated in FIG. 2 and includes an accurate strap 56 and a pair of companion bolted flanges, 58.

In the configuration shown in FIG. 1, four of the adjustable hook means 92 are clamped on the front tubular support members which would facilitate the winding of an extension cord around the four hook members 92. However, as will be readily appreciated by those skilled in the art, the adjustable hook means may be placed on any of the tubular support members in many advantageous configurations and each adjustable hook means can be individually placed anywhere along the length of any of the tubular support members resulting in many customizable uses.

In the present invention, a novel rigid construction of a utility cart is provided in a utility cart having the features of the present invention. A utility cart which has a base member, a top tray member, and an intermediate tray is provided. A rigid construction of the utility cart having these features comprises the following elements. A plurality of tubular support members 44 are provided which are held in compression between the base member 12 and the upper tray member 16 by threaded rod 60 and nut arrangement 68 to 70. In this configuration, the threaded rod passes through the upper member 16 and the base member 12 and through the center of the tubular support member 44. The nut arrangement 68 and 70 screwably places compression on the tubular support members 44 by engaging a bottom side 96 of the base member 12 and a top side 98 of the upper tray member 16, thereby operating to clamp the tubular support member 44 between base member 12 and the upper tray member 16.

In a preferred embodiment of the present invention, the plurality of tubular support members is further defined as being four lengths of PVC tubing which are disposed at the corners of the utility tray portion 20 of the base member and the corners of the upper tray member 16.

In a preferred embodiment of the invention, the base member 12 is provided which includes a mop bucket securing portion 24 with vertical walls 100, 102, 104 and 106, which define a first box-like portion. The mop bucket securing portion 24 includes caster curbs 26 for securing a mop bucket in non-moving engagement while the mop bucket is being transported on the utility cart. As will be appreciated by one skilled in the art, the use of a mop bucket having casters on the bottom is common. The caster curbs 26 are situated as to provide secure means for stopping movement of a castered mop bucket and extend to provide a level surface 29 for a mop bucket without casters. Thus, the present invention provides a simple means for transporting a mop bucket with limited spilling of the bucket and without being encumbered by the necessity of the cleaning person having to pull the mop bucket behind him or her or carrying the mop bucket separately.

The draining surface 28 is provided on the mop bucket securing drain portion 24 for easy draining of any water which has been spilled from the mop bucket. Included in the draining surface is a drain and drain plug arrangement 30 for selectively retaining or emptying the water in the draining surface 28. The base member 12 also has a molded bumper 108 around the periphery of the base member 12 and provides for protection of furniture and other things which may be damaged by careless operation of the utility cart and further operates to protect the utility cart from undue damage.

The base means 12 also includes a lower utility tray portion 20 which is adjacent to and sharing a vertical wall 106 with the mop bucket portion 24. The utility tray portion 20 has vertical walls 106, 110, 112 and 114 which define a second box-like portion. The lower support member engagement means is located at each of the corners of the box-like portion of the lower utility tray portion 20. A terminal utensil handle retention portion 82 is also provided and has a second vertical wall 116 which is parallel to vertical side wall 114 and defines an open slot for engaging the terminal end of a utensil handle.

The top tray member 16 has vertical walls 118, 120, 122 and 123 which define a box-like upper tray portion. The top member also includes upper support member engagement means 42 located at the corners of the box-like portion. A plurality of molded utensil clips 36 which are integrally formed within opposite side walls 120 and 124 of the top tray member 16 is provided. A plurality of modified mop handle engaging clips 130 which have a generally bent hour-glass cross-sectional shape formed of skewed opposing frustoconical surfaces 132, 134, are provided for securely holding a mop handle which is disposed at an angle out of the mop bucket. Also included is a handle means 38 which defines a central opening 40 for placement of a trash bag in a bag open arrangement. Also included on the handle member are hooks 39 extending from the bottom of handle 38. The hooks are positioned to hang a sign from such as a "Caution, Wet Floor" sign generally used while the operator is mopping a floor.

Four tubular support members 32 preferably consisting of PVC tubing are provided which are compressibly engaged between the lower support member engagement portion 22 and the upper support member engagement portion 42 by compression rod 60 with threaded ends 68 and 70 which pass through the upper and lower 42, 22 support member engagement portions and engage the upper and lower support member engagement portions with a pair of end nuts 72 and 74. The releasable arcuate clamps include arcuate clamping strap 56 having a pair of companion bolted flanges 58 which are operatively attached to the intermediate tray 14 for tensioning the arcuate clamping strap 56 radially inwardly, which in turn clamps the tubular support member between the arcuate clamping strap 56 and the intermediate tray 52. The base means 12 also includes a pair of multidirectional front casters 122 and a pair of axially mounted rear wheels 124 for support and movement of the utility cart. The base means also includes rear wheel fenders 126 located at the side of the utility tray portion 20 which protect spray from the rear wheels 124. In addition, the intermediate tray includes a handle 128 attached to the side of the intermediate tray 14 which may be used in steering the utility cart.

Figure 2:
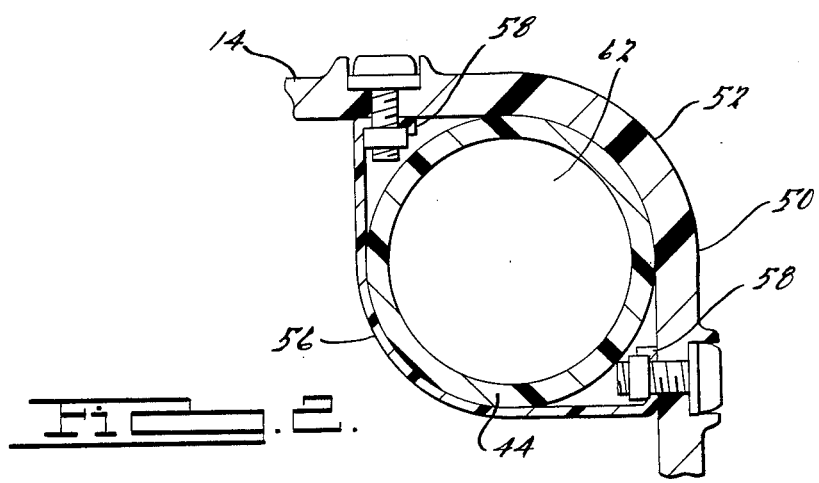
FIG. 2 is a cross sectional top view of the adjustable clamping assembly of the present invention.

Also provided is at least one adjustably mounted hook member 92 which includes the same arcuate clamping arrangement disclosed above (FIG. 2). Any number of these members can be used and positioned on any of the tubular support members of the present invention as required by the final user.

The utility cart of the present invention provides a lightweight efficient cart which is substantially made of lightweight plastic material in its preferred embodiment which is impervious to water and caustic chemical used in the cleaning process. In addition, the major structural components are readily available PVC tubing and threaded rod providing for easy construction and versatility in the utility cart.

The invention has been described in an illustrative manner and it is to be understood that the terminology which has been used is intended to be that of description rather than of limitation.

Obviously, many modifications and variations of the present invention are possible in light of the above teachings. It is therefore to be understood that within the scope of the appended claims, the invention may be practiced otherwise than as specifically described.

What is claimed is:

1. A manually propelled utility cart comprising:
    base means positioned in substantially a horizontal plane, said base means including a utility tray means, lower support engaging means and a mop bucket carrying means, wheeled movement means coupled with said base means for multidirectional horizontal movement of said utility cart along a floor surface;
    intermediate tray means positioned above said base means;
    top tray means positioned above said base means and including utensil holding means, handle means and upper support engaging means;
    vertical structural support means for supporting said intermediate tray means and said top tray means vertically upward from said base means, and said intermediate tray means having adjustable positioning means and being in slidable engagement with said vertical structural support means;
    said vertical structural support means including at least one hollow rod structural member engaged and secured in compression between said base means and said top tray means by a compression means and said hollow rod structural member engaged and secured in compression between said upper support engaging means and said lower support engaging means;
    said adjustable positioning means including releasable clamping means for releasably clamping said intermediate tray means in variable vertical positions between said utility tray means and said top tray means;
    said utensil holding means including a plurality of clips integrally molded on sides of said top tray means and each of said clips having a pair of resilient clamping arms and a handle securing portion and a modified mop handle engagement means integrally molded on said top tray means facing said mop bucket carrying means;
    said modified mop handle engaging means having a pair of resilient clamping arms and a mop handle engaging surface means for engaging a mop handle disposed at an angle.

2. The manually propelled utility cart of claim 1 wherein:
    said slidable engagement of said intermediate tray is accomplished by a through hole in said intermediate tray means at a corner of said intermediate tray means and said through hole having an arcuate vertical surface for engaging the outside diameter of said tubular structural member;
    said clamping means including an arcuate strap having a pair of companion bolted flanges, operatively attached to said arcuate vertical surface for securely clamping said tubular structural member between said arcuate vertical surface and said arcuate strap.

3. The manually propelled utility cart of claim 2 wherein:
said compression means includes threaded rod means, for internal placement of said threaded rod means in the central opening in said tubular structural member, and said threaded rod means also passing through a hole in said upper and lower support post mounting means, and defining a pair of threaded engaging ends;
nut means for operatively engaging said threaded rod means at said threaded engaging ends and compressing said tubular support member between said upper and lower support post mounting means.

4. The manually propelled utility cart of claim 3 wherein said tubular support member includes at least one length of PVC tubing.

5. The manually propelled utility cart of claim 4 wherein said base means includes a mop bucket carrying means for carrying a mop bucket.

6. The manually propelled utility cart of claim 5 wherein said mop bucket carrying means includes means for restraining movement of a castered mop bucket on said mop bucket carrying means.

7. The manually propelled utility cart of claim 6 wherein said mop bucket carrying means includes caster curbs for engaging and restraining movement of mop bucket casters.

8. The manually propelled utility cart of claim 7 wherein said mop bucket carrying means defines a level surface for carrying a mop bucket not having casters.

9. The manually propelled utility cart of claim 5 wherein said mop bucket carrying means is further defined as being a rectangular box-like portion and includes four pairs of rib members extending diagonally inward from corners of said box-like portion and operating to securely hold casters of a castered mop bucket and for providing a level surface for securely holding a mop bucket without casters.

10. The manually propelled utility cart of claim 5 wherein said mop bucket carrying means includes a draining surface and a drain and drain plug means for selectively retaining or draining any spillage from the mop bucket.

11. The manually propelled utility cart of claim 10 wherein said draining surface is further defined as being a floor of said box-like portion and said floor being tapered downward toward said drain and drain plug means.

12. The manually propelled utility cart of claim 11 wherein said draining surface is further defined as including four triangular shaped draining portions which generally form an inverse pyramidal shaped surface.

13. The manually propelled utility cart of claim 1 wherein said handle means further includes integral trash bag retention means.

14. The manually propelled utility cart of claim 1 wherein said mop handle engaging surface means further includes a frusto-conical surface for engaging a mop handle disposed at an angle.

15. The manually propelled utility cart of claim 1 wherein said mop handle engaging surface further includes a skewed frusto-conical surface such that the surface portion closest to said top tray is at a greater angle to the vertical than an outermost surface, of said resilient clamping arms away from said top tray.

16. The manually propelled utility cart of claim 1 wherein said mop handle engaging surface further includes a pair of opposing and skewed frusto-conical surfaces forming a bent-hourglass cross-sectional shape having a ridge substantially at the center of said bent hourglass cross sectional shape.

17. The manually propelled utility cart of claim 1 further including adjustable hook means for placement on said tubular structural member in sliding clampable engagement with said tubular structural member.

18. The manually propelled utility cart of claim 1 wherein said adjustable hook means includes a hook portion, a body portion and a clamping portion including said clamping means further defined as being an arcuate strap having a pair of bolted flanges for clamping said vertically adjustable hook means in variable vertical positions along said tubular structural member.

19. The manually propelled utility cart of claim 17 wherein said hook portion and body portion are integrally molded.

20. The manually propelled utility cart of claim 17 wherein said hook portion is swivably mounted on said body portion.

21. A manually propelled utility cart comprising:
a base including a mop bucket securing portion having vertical wall members defining a first box portion, caster curbs for securing a castered mop bucket in non-moving engagement, a draining surface and a centrally disposed removably plugged drain for draining said box-like portion, an integrally molded bumper situated around the periphery of said base means for protection of furniture and utility cart from damage;
said base including a lower utility tray portion adjacent and sharing a vertical wall with said mop bucket portion and said utility tray portion having vertical walls defining a second box-like portion, and lower support member engagement means at each of the corners of said box-like portion of said lower utility tray portion, a terminal utensil handle retention portion having a second vertical wall parallel to a vertical side wall and defining an open slot for engaging the terminal end of a utensil handle;
a top tray including a top tray portion having upper support member engagement portions and vertical walls defining a box-like upper tray, a plurality of molded utensil clips integrally formed within opposite side walls of said top tray portion, a handle means defining a central opening for placement of a trash bag in a bag opened arrangement, a plurality of modified mop handle engaging clips having a generally bent hour-glass cross sectional engaging shape formed of opposing frusto-conical surfaces.
four PVC tubing support members compressibly engaged between said lower support member engagement portions and said upper support member engagement portions by a compression rod with threaded ends passing through said upper and lower support member engagement portions and engaging said upper and lower support member engagement portions with a pair of end nuts;
an intermediate tray, in slidable engagement with said PVC tubing support means and including a releasable arcuate clamp for releasably clamping said intermediate tray and further including vertical walls defining an intermediate tray, said intermediate tray including vacuum wand extension holders integrally formed therein for engagement into an open end of a vacuum wand extension, said vacuum wand extension holders extending upward from said intermediate tray and having a cross-like cross section;

said releasable arcuate clamps including an arcuate clamping strap having a pair of companion bolted flanges operatively attached to said intermediate tray for tensioning said arcuate clamping strap radially inwardly for clamping said PVC tubing support member between said arcuate clamping strap and said intermediate tray, said base including a pair of multidirectional front casters and a pair of rear side wheels for support and movement of said utility cart;

said base including rear wheel fenders located at the side of said utility tray portion for protecting any spray from said rear wheels;

said intermediate tray also including a handle attached to a side of said intermediate tray for use in steering said utility cart, and at least one adjustably mounted hook members including said releasable arcuate clamps for adjustable mounting in said PVC tubing support member.

22. A manually propelled utility cart comprising:

a base means positioned in substantially a horizontal plane and including a mop bucket carrying means, said mop bucket carrying means comprised of a rectangular box-like portion including a plurality of rib members on said base means extending diagonally inward from corners of said box-like portion and operating to securely hold casters of a castered mop bucket and for providing a level surface for securely holding a mop bucket without casters;

wheeled movement means coupled with said base means for multidirectional horizontal movement of said utility cart along a floor surface;

intermediate tray means positioned above said base means;

top tray means positioned above said base means and said intermediate tray means;

vertical structural support means for supporting said intermediate tray means and said top tray means vertically upward from said base means, and said intermediate tray means having adjustable positioning means and being in slidable engagement with said vertical structural support means;

said vertical structural support means including at least one hollow rod structural member engaged and secured in compression between said base means and said top tray means by a compression means;

said adjustable positioning means including releasable clamping means for releasably clamping said intermediate tray means in variable vertical positions between said utility tray means and said top tray means.

* * * * *

UNITED STATES PATENT AND TRADEMARK OFFICE
CERTIFICATE OF CORRECTION

PATENT NO. : 4,743,040

DATED : May 10, 1988

INVENTOR(S) : Frank Breveglieri
Kenneth F. Streit

It is certified that error appears in the above-identified patent and that said Letters Patent is hereby corrected as shown below:

Column 5, Line 67, Page 10, Line 19, "swiveable" should be --swivelable--

Column 6, Line 27, Page 11, Line 12, after "upper" insert --tray--

Column 7, Line 67, Page 14, Line 15, "chemical" should be --chemicals--

Column 10, Line 22, Claim 20, Page 19, Line 2, Claim 27, "swivably" should be --swivelably---

Column 10, Line 54, Claim 21, Page 21, Line 24, Claim 30, after "surfaces" delete "." and substitute --;--

Column 11, Line 22, Claim 21, Page 22, Line 52, Claim 30, "members" should be --member--

Signed and Sealed this

Thirteenth Day of December, 1988

Attest:

DONALD J. QUIGG

*Attesting Officer*   *Commissioner of Patents and Trademarks*